United States Patent Office 3,840,589
Patented Oct. 8, 1974

3,840,589
PRODUCTION OF PURE 1-ACETOXY-
3-METHYLBUT-2-EN-4-AL
Walter Himmele, Walldorf, and Werner Aquila, Ludwigshafen, Germany, assignors to Badische Anilin- & Soda-Fabrik Aktiengesellschaft, Ludwigshafen (Rhine), Germany
No Drawing. Continuation-in-part of abandoned application Ser. No. 63,027, Aug. 11, 1970. This application Oct. 3, 1972, Ser. No. 222,298
Int. Cl. C07c 67/00
U.S. Cl. 260—491
7 Claims

ABSTRACT OF THE DISCLOSURE

Production of pure 1-acetoxy-3-methyl-but-2-en-4-al by heating commercial mixtures of 1,2-diacetoxy-3-methylbutan-4-al and 1,2-diacetoxypentan-5-al in the presence of absence of a salt-like catalyst Q+Y− where Q+ stands for an ammonium cation or an alkali metal cation or the equivalent of an alkaline earth metal or a polyvalent anion exchanger and Y− stands for a strongly nucleophilic anion or, if this is polyvalent, the equivalent thereof and separating the 1-acetoxy-3-methyl-but-2-en-4-al obtained from the unreacted starting material.

---

This invention is a continuation-in-part application of our application Ser. No. 63,027, filed Aug. 11, 1970, and now abandoned.

The present invention relates to a novel process for the production of pure 1-acetoxy-3-methylbut-2-en-4-al of the structure I:

Ac—O—CH$_2$—CH=C—CHO
                            |
                            CH$_3$     (I)

in which Ac stands for acetyl, from commercial mixtures of 1,2-di-acetoxy - 3 - methylbutan-4-al (II) and 1,2-diacetoxypentan-5-al (III).

It is known that 1-acetoxy-3-methylbut-2-en-4-al (I) can be prepared by reaction of hexamethylenetetramine with 1-chloro-2-methyl-4-acetoxy-2-butene and subsequent hydrolysis of the complex obtained (U.K. Patent Specification 736,488). However, yields are low.

It is also known that compound (I) can be prepared by reaction of ω-chloro- or ω-bromotiglaldehyde with alkali metal acetate or alkaline earth metal acetate (German Published Application 1,227,000) or by rearrangement of 2-formyl-2-hydroxybut-3-ene or its acetate in the presence of copper or copper compounds (Dutch Pat. 6,810,954). These methods are however relatively expensive. In contrast to this, a commercial mixture consisting of 1,2-diacetoxy-3-methylbutan-4-al (II) and 1,2-diacetoxypentan-5-al (III) is obtained in a simple manner by the hydroformylation of 1,2-diacetoxybut-3-en (IV) with a mixture of carbon monoxide and hydrogen using rhodium as catalyst. They can be separated only with the greatest difficulty, as their boiling points are close together and because they do not exhibit very good thermal stability. It is possible to disacetylate the mixture, but this produces, by normal methods, another isomer mixture comprising the compound of structure I and 1-acetoxypent-2-en-5-al (V). This latter mixture is, however, just as difficult to separate as the initial mixture of compounds II and III.

It is an object of the present invention to prepare compound I in a pure form from the said mixture of isomers, which compound is particularly important for the synthesis of compounds in the vitamin A series.

We have found a process for the preparation of pure 1-acetoxy-3-methylbut - 2 - en-4-al which comprises heating a commercial mixture of 1,2-diacetoxy-3-methylbutan-4-al and 1,2-diacetoxypentan-5-al at a temperature of from 50 to 180° C. and separating the 1-acetoxy-3-methylbut-2-en-4-al obtained from the unreacted starting material.

In this reaction the diacetoxybutanal II is split into 1-acetoxy-3-methylbut-2-en-4-al (β-formyl crotyl acetate; (I) and acetic acid (V)

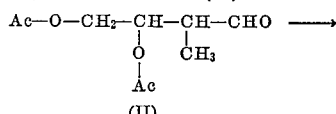

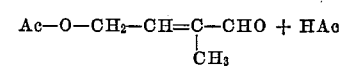

while the diacetoxypentanal III is not attacked. The mixture of I, III and acetic acid can be easily separated, for example by distillation at subatmospheric pressure (at 6 mm. Hg I boils at 84° C., while III boils at a temperature as high as 135° to 140° C.).

The ratio of 1,2-diacetoxy-3-methylbutan-4-al (II) to 1,2-diacetoxypentan-5-al (III) in the starting mixture may vary within wide limits. Generally mixtures having a ratio of II:III of 70:30 to 40:60 are used.

When no catalyst is used the reaction proceeds at a rate sufficient for commercial-scale operation if the mixture of 1,2-diacetoxy-3-methylbutan-4-al and 1,2-diacetoxypentan-5-al is heated at a temperature of 140° to 180° C. The reaction times required for practically 100% conversion of diacetoxybutanal II into acetoxymethylbutenal I and acetic acid are about 600 minutes at 140° C.,
about 120 minutes at 160° C., and
about 40 to 50 minutes at 180° C.

The use of temperatures substantially higher than 180° C. is not recommended because of the sensitivity of the reaction products and the risk of acetic acid being thermally split off from the diacetoxypentanal III contained in the reaction mixture.

The acetic acid which is liberated in the splitting is advantageously distilled off from the reaction mixture during the reaction.

Moreover, it is advantageous to choose such reaction conditions that the 1-acetoxy - 3 - methylbut - 2 - en-4-al formed in the reaction is immediately removed from the reaction mixture by distillation. For this purpose subatmospheric pressure is employed. For example, 1-acetoxy-3-methylbut-2-en-4-al boils at about 140° C. at a pressure of 65 mm. Hg,
at about 160° C. at a pressure of 120 mm. Hg, and
at about 180° C. at a pressure of 240 mm. Hg.

Even at low temperatures the reaction proceeds at a rate sufficient for commercial-scale operation if the starting mixture is heated in the presence of a salt-like catalyst Q+Y− in which Q+ stands for an ammonium cation or an alkali metal cation or the equivalent of an alkaline earth metal cation or a polyvalent anion exchanger and Y− stands for a strongly nucleophilic anion or, if this is polyvalent, the equivalent thereof.

Examples of suitable cations Q+ are the cations of the general formula NR$_4$+, in which the radicals R may be the same or different and stand for hydrogen or alkyl radicals, such as the cations NH$_4$+, tetramethylammonium, trimethylammonium, dimethylammonium, methylammonium, methylethylammonium and the like. This series also includes the anion exchangers which are mostly cross-linked, insoluble macromolecular compounds carrying a plurality of primary, secondary, tertiary or, more usually, quaternary ammonium groups. Of the metallic cations Q+ sodium, potassium and barium are preferred.

Strongly nucleophilic (basic) anions are, for example, chloride, bromide, iodide, hydroxyl, cyanide, carbonate, hydrogen carbonate, phosphate, acylates, alcoholates and phenolates. The nucleophilic moiety in the anion Y⁻ should be at least as strong as in the chloride ion.

The catalyst is usually employed in amounts of from 0.001 to 10% by weight based on the starting mixture.

The preferred quantities of the catalyst Q⁺Y⁻ are in the range 0.01 to 1%, and the preferred temperatures range from 70° to 130° C.

When less than 0.001% by weight of catalyst is used, it is recommended to heat the mixture at 140° to 180° C.

The reaction is normally carried out without solvents, but it is possible to operate in the presence of an inert solvent or diluent, suitable examples of which are hydrocarbons such as benzene, toluene, petroleum ether, ligroin and substituted hydrocarbons such as anisole.

The course and end of the reaction may be readily determined by observing the acetic acid eliminated. After removal of the acetic acid, the catalyst and, if necessary, the solvent, the remaining mixtures of compounds I and III may be readily separated due to the difference in their physical properties, for example by extraction or, preferably, by distillation under reduced pressure. For example, compound I boils, at 6 mm. Hg, at 84° C. and compound III at from 135° to 140° C.

The process provides high yields of 1-acetoxy-3-methylbut-2-en-4-al (I), valuable for organic synthesis, especially for the synthesis of compounds of the vitamin-A series, without the isomer 1-acetoxypent-2-en-5-al (V) being produced in appreciable quantities.

EXAMPLE 1

410 g. of a mixture of 282 g. of 3-methyl-1,2-diacetoxybutan-4-al and 128 g. of 1,2-diacetoxypentan-5-al is heated at 170° C. for 150 minutes, part of the acetic acid liberated being distilled off. After completion of the reaction the mixture is cooled and subjected to distillation. 195 g. of 1-acetoxy-3-methylbut-2-en-4-al, 84 g. of acetic acid, 122 g. of 1,2-diacetoxypentan-5-al, and 9 g. (equivalent to 2.2%) of residue are obtained. This corresponds to a yield of 1-acetoxy-3-methylbut-2-en-4-al of 98% of the theory, based on II.

EXAMPLE 2

250 g. of a mixture of 178 g. of 3-methyl-1,2-diacetoxybutan-4-al, 67 g. of 1,2-diacetoxypentan-5-al and 5 g. of butene-1-diol-3,4-diacetate is heated to 170° C. together with 0.001 g. of sodium acetate. As a result of the formation of acetin acid the temperature of the contents of the vessel decreases to 160° C. in the course of about 15 minutes. The reaction is allowed to proceed at this temperature for another 15 minutes, the acetic acid being distilled off, and then the reaction mixture is worked up.

119 g. of 1-acetoxy-3-methylbut-2-en-4-al, 65 g. of 1,2-diacetoxypentan-5-al, 4.5 g. of buten-1-diol-3,4-diacetate, 52 g. of acetic acid, and 7.5 g. (equivalent to 3.0%) of residue are obtained. The yield of 1-acetoxy-3-methylbut-2-en-4-al is therefore 95% of the theory.

EXAMPLE 3

117 g. of a mixture of compounds II and III in substantially equal parts is heated with 0.2 g. of anhydrous sodium acetate for 1 hour at 110° C. The mixture is then worked up to produce compound I in 89% yield, b.p. 84° C./6 mm.

EXAMPLE 4

27 g. of a mixture of compounds II and III in substantially equal parts is heated with 0.2 g. of barium hydroxide for 15 minutes at 110° C. The mixture is worked up to provide compound I in 84% yield.

EXAMPLE 5

46.1 g. of a mixture of compounds II and III in equal parts is heated with 1 g. of a basic ion exchanger containing tertiary ammonium groups (sold under the name "Lewatit" MP 62, "Lewatit" being a registered trademark) for 30 minutes at 100° C. The mixture is worked up to provide compound I in 93% yield.

We claim:
1. A process for the production of pure 1-acetoxy-3-methylbut-2-en-4-al (I) from mixtures of 1,2-diacetoxy-3-methylbutan-4-al (I) and 1,2-diacetoxypentan-5-al (III) which comprises heating said mixture to a temperature of from 50 to 180° C. in the presence of a salt-like catalyst Q⁺Y⁻ or at a temperature of from 140 to 180° C. in the absence of said catalyst where Q⁺ stands for an alkali metal cation or one equivalent of an alkaline earth metal cation or an ammonium cation of the formula NR₄⁺ in which the radicals R may be the same or different and stand for hydrogen or alkyl radicals or a polyvalent anion exchanger carrying a plurality of said primary, secondary, tertiary or quaternary ammonium groups and Y⁻ stands for a strongly nucleophilic anion selected from the group consisting of chloride, bromide, iodide, hydroxide, cyanide, acetate, hydrogen carbonate and one equivalent of carbonate and phosphate to split said compound II into said compound I and acetic acid, and thereafter separating by distillation said compound I from said compound III and said acetic acid.

2. A process as set forth in claim 1 wherein said mixture has a ratio of compound II:compound III of from 70:30 to 40:60.

3. A process as set forth in claim 1 wherein said heating step is carried out in the presence of from 0.001 to 10% by weight based on the weight of said mixture of said salt-like catalyst.

4. A process as set forth in claim 3 wherein the mixture of compounds II and III is heated in the presence of from 0.01 to 1% of its weight of the salt-like catalyst.

5. A process as set forth in claim 4 wherein said mixture is heated at a temperature of from 70 to 140° C.

6. A process as set forth in claim 3 wherein said mixture is heated with said salt-like catalyst Q⁺Y⁻, where Y⁻ stands for an acetate anion.

7. A process as set forth in claim 1 wherein the temperature and pressure of the reaction mixture is controlled such that both acetic acid and said compound I are immediately removed from the reaction mixture as they are formed.

References Cited
UNITED STATES PATENTS

| | | | |
|---|---|---|---|
| 2,400,727 | 5/1946 | Yale | 260—491 |
| 2,575,896 | 11/1951 | Smith et al. | 260—491 |
| 3,655,735 | 4/1972 | Pommer et al. | 260—491 |

VIVIAN GARNER, Primary Examiner

U.S. Cl. X.R.

260—541

UNITED STATES PATENT AND TRADEMARK OFFICE
CERTIFICATE OF CORRECTION

PATENT NO. : 3,840,589
DATED : October 8, 1974
INVENTOR(S) : Walter Himmele and Werner Aquila It is certified that error appears in the above—identified patent and that said Letters Patent are hereby corrected as shown below:

Column 1, in the heading, insert--Claims priority, Applications Germany, August 16, 1971, P 19 41 632.1, and February 10, 1971, P 21 06 242.0--;

Column 2, line 5, delete "($\beta$-formyl crotyl acetate; (I)" and substitute--($\beta$-formyl crotyl acetate; I)--;

Column 4, line 19, delete "(I)" and substitute--(II)--

Signed and Sealed this ninth Day of December 1975

[SEAL]

Attest:

RUTH C. MASON
Attesting Officer

C. MARSHALL DANN
Commissioner of Patents and Trademarks